(12) United States Patent
Kikuchi (10) Patent No.: US 12,246,755 B2
(45) Date of Patent: Mar. 11, 2025

(54) VEHICLE CONTROLLER, VEHICLE CONTROL METHOD, AND COMPUTER PROGRAM FOR VEHICLE CONTROL

(71) Applicant: TOYOTA JIDOSHA KABUSHIKI KAISHA, Toyota (JP)

(72) Inventor: Takuro Kikuchi, Edogawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 18/127,714

(22) Filed: Mar. 29, 2023

(65) Prior Publication Data

US 2023/0311952 A1 Oct. 5, 2023

(30) Foreign Application Priority Data

Mar. 31, 2022 (JP) .................................. 2022-061156

(51) Int. Cl.
*B60W 60/00* (2020.01)
*B60W 30/095* (2012.01)
*B60W 50/14* (2020.01)

(52) U.S. Cl.
CPC ...... *B60W 60/0053* (2020.02); *B60W 30/095* (2013.01); *B60W 50/14* (2013.01); *B60W 2050/146* (2013.01)

(58) Field of Classification Search
CPC ........... B60W 60/0053; B60W 30/095; B60W 50/14; B60W 2050/146; G05D 1/0061; G01S 13/93; B60Q 9/00
USPC ........................................................ 701/23
See application file for complete search history.

(56) References Cited

U.S. PATENT DOCUMENTS

| 2016/0375912 A1* | 12/2016 | Christensen ............. B60Q 9/00 701/25 |
| 2017/0303842 A1 | 10/2017 | Yoshida et al. |
| 2018/0173227 A1* | 6/2018 | Mukai ............... B60W 60/0051 |
| 2018/0257667 A1 | 9/2018 | Yoshii et al. |
| 2018/0375161 A1* | 12/2018 | Okumura ............... H01M 10/28 |

(Continued)

FOREIGN PATENT DOCUMENTS

| EP | 3718848 A1 * | 10/2020 | |
| EP | 3730375 A1 * | 10/2020 | ............ B60W 40/04 |

(Continued)

OTHER PUBLICATIONS

Yan Li et al., "Safety Analysis Based on Critical Scenarios and Collision Avoidance of Highly Automated Vehicle," 2020, Publisher: IEEE.*

*Primary Examiner* — Tuan C To
(74) *Attorney, Agent, or Firm* — Dinsmore & Shohl LLP (57) ABSTRACT

A vehicle controller includes a processor configured to determine whether to transfer driving control of a vehicle under autonomous driving control to a driver, notify the driver of a transition demand via a notification device in the case where driving control will be transferred to the driver, execute deceleration control of the vehicle at predetermined timing after notification timing of the transition demand, and continue deceleration control of the vehicle even after a predetermined period from the notification timing in the case where the speed of the vehicle decreases to a predetermined speed threshold or less within the predetermined period and where operation by the driver to take over driving is not detected.

8 Claims, 6 Drawing Sheets

(56) References Cited

U.S. PATENT DOCUMENTS

| | | | |
|---|---|---|---|
| 2019/0056732 A1 | 2/2019 | Aoi et al. | |
| 2019/0295417 A1 | 9/2019 | Hiramatsu et al. | |
| 2020/0079395 A1 | 3/2020 | Ibuka et al. | |
| 2020/0139990 A1 | 5/2020 | Hiruma | |
| 2020/0180633 A1* | 6/2020 | Wu | B60W 30/18163 |
| 2020/0239027 A1* | 7/2020 | Watanabe | B60W 50/14 |
| 2020/0307632 A1* | 10/2020 | Tsuji | B60W 60/0059 |
| 2022/0119000 A1* | 4/2022 | Kanoh | B60W 30/143 |

FOREIGN PATENT DOCUMENTS

| | | |
|---|---|---|
| JP | 2016-064773 A | 4/2016 |
| JP | 2017-097518 A | 6/2017 |
| JP | 2018-144740 A | 9/2018 |
| WO | 2017/203691 A1 | 11/2017 |
| WO | 2018/109868 A1 | 6/2018 |
| WO | 2018/235470 A1 | 12/2018 |

* cited by examiner

VEHICLE CONTROLLER, VEHICLE CONTROL METHOD, AND COMPUTER PROGRAM FOR VEHICLE CONTROL

CROSS-REFERENCE TO RELATED APPLICATION

This application is a national phase of Japanese Patent Application No. 2022-061156 filed on Mar. 31, 2022, the entire contents of which are herein incorporated by reference.

FIELD

The present disclosure relates to a vehicle controller, a vehicle control method, and a computer program for controlling travel of a vehicle.

BACKGROUND

When it becomes difficult to continue autonomous driving control of a vehicle for some reason during the autonomous driving control, driving control of the vehicle is transferred from a vehicle controller to a driver in some cases. Techniques to smoothly achieve transfer of driving control in such cases have been proposed (see International Publication WO2018/109868A and Japanese Unexamined Patent Publications JP2018-144740A and JP2017-97518A).

A vehicle controller disclosed in WO2018/109868A executes state changing control for changing the state of a host vehicle when travel control is taken over or predicted to be taken over from autonomous driving to manual driving, based on a travel situation around the host vehicle. As the state changing control, the vehicle controller sets the acceleration or deceleration of the host vehicle less than a setting value in acceleration or deceleration control for the case where the state changing control is not executed.

A controller of a driverless vehicle disclosed in JP2018-144740A shifts from autonomous driving mode to manual driving mode before a second brake device to decelerate the vehicle starts deceleration in autonomous driving mode, upon operation of a steering operating part, a brake operating part, or an accelerator operating part. From when the second brake device starts deceleration until a first brake device to keep the vehicle stopped automatically starts working in autonomous driving mode, the controller shifts from autonomous driving mode to manual driving mode, upon operation of the steering operating part or the accelerator operating part.

A device for assisting in autonomous driving disclosed in JP2017-97518A sets discrete levels each indicating how likely a switch from autonomous driving to manual driving can be made in a predetermined switching section, based on the state of the driver. The device further reduces a travel speed of the vehicle in all or part of the switching section during autonomous driving, depending on a set level. When the reduced travel speed is less than a minimum speed, the device warns the driver or automatically stops the vehicle in an evacuation zone.

SUMMARY

At takeover of driving control of a vehicle from a controller to a driver, the controller notifies the driver of a transition demand to take over driving control from the controller to the driver. However, if the driver does not take over driving of the vehicle even after a certain period from the notification of the transition demand, the safety of the vehicle may be compromised.

It is an object of the present disclosure to provide a vehicle controller that can raise the level of safety at takeover of driving control of a vehicle from the vehicle controller to a driver.

According to an embodiment, a vehicle controller is provided. The vehicle controller includes a processor configured to: determine whether to transfer driving control of a vehicle under autonomous driving control to a driver, notify the driver of a transition demand via a notification device provided in the vehicle in the case where driving control of the vehicle will be transferred to the driver, execute deceleration control of the vehicle at predetermined timing after notification timing of the transition demand, and continue deceleration control of the vehicle even after a predetermined period from the notification timing in the case where the speed of the vehicle decreases to a predetermined speed threshold or less within the predetermined period and where operation by the driver to take over driving is not detected.

In some embodiments, the processor of the vehicle controller is further configured to stop autonomous driving control of the vehicle at the end of the predetermined period in the case where the speed of the vehicle is not less than the predetermined speed threshold until after the predetermined period from the notification timing and where operation by the driver to take over driving is not detected.

In this case, in some embodiments, until after the predetermined period from the notification timing, the processor determines that the operation by the driver to take over driving has been performed, upon detection of operation of a steering wheel of the vehicle by the driver or both hold of the steering wheel and operation of an accelerator or a brake by the driver. In some embodiments, after the predetermined period from the notification timing, the processor determines that the operation by the driver to take over driving has been performed, upon detection of operation of the steering wheel of the vehicle by the driver or operation of the accelerator or the brake by the driver without hold of the steering wheel.

In some embodiments, when the speed of the vehicle is not greater than a predetermined speed threshold, the processor continues deceleration control of the vehicle unless operation of an accelerator or a brake by the driver is detected as the operation by the driver to take over driving. In some embodiments, the speed of the vehicle is greater than the predetermined speed threshold, the processor stops autonomous driving control of the vehicle upon detection of operation of a steering wheel by the driver or predetermined operation by the driver including hold of the steering wheel as the operation by the driver to take over driving.

In some embodiments, the processor further adjusts the predetermined speed threshold, depending on the gradient of a road being traveled by the vehicle.

In some embodiments, the processor is further configured to determine whether acceleration of the vehicle after transfer of driving control of the vehicle to the driver causes a danger of a collision between the vehicle and another object, depending on a cause of determination that driving control of the vehicle will be transferred to the driver or the situation around the vehicle, and continue deceleration control of the vehicle, even after the predetermined period, only when it is determined that the danger still exists.

According to another embodiment, a method for vehicle control is provided. The method includes determining whether to transfer driving control of a vehicle under autonomous driving control to a driver; notifying the driver of a transition demand via a notification device provided in the vehicle in the case where driving control of the vehicle will be transferred to the driver; executing deceleration control of the vehicle at predetermined timing after notification timing of the transition demand; and continuing deceleration control of the vehicle, even after a predetermined period from the notification timing in the case where the speed of the vehicle decreases to a predetermined speed threshold or less within the predetermined period and where operation by the driver to take over driving is not detected.

According to still another embodiment, a non-transitory recording medium that stores a computer program for vehicle control is provided. The computer program includes instructions causing a processor mounted on a vehicle to execute a process including determining whether to transfer driving control of the vehicle under autonomous driving control to a driver; notifying the driver of a transition demand via a notification device provided in the vehicle in the case where driving control of the vehicle will be transferred to the driver; executing deceleration control of the vehicle at predetermined timing after notification timing of the transition demand; and continuing deceleration control of the vehicle, even after a predetermined period from the notification timing in the case where the speed of the vehicle decreases to a predetermined speed threshold or less within the predetermined period and where operation by the driver to take over driving is not detected.

The vehicle controller according to the present disclosure has an effect of being able to raise the level of safety at takeover of driving control of a vehicle from the vehicle controller to a driver.

DESCRIPTION OF EMBODIMENTS

A vehicle controller, a method for vehicle control executed by the vehicle controller, and a computer program for vehicle control will now be described with reference to the attached drawings. In the case where driving control of a vehicle will be transferred to a driver for some reason, the vehicle controller executes deceleration control to decelerate the vehicle at a constant deceleration, at predetermined timing. If the vehicle controller transferred driving control to the driver and stopped deceleration control after a certain period from notification of a transition demand (TD), the vehicle might accelerate in some cases, for example, because of creeping, depending on the speed of the vehicle; and it would be difficult to decelerate by engine braking, which may result in compromising the safety of the vehicle.

Thus the vehicle controller continues deceleration control of the vehicle, even after a predetermined period from notification timing of a transition demand in the case where the speed of the vehicle decreases to a predetermined speed threshold or less within the predetermined period and where the driver's operation to take over driving (hereafter "takeover operation") is not detected. In the case where the speed of the vehicle does not fall below the predetermined speed threshold, the vehicle controller transfers driving control of the vehicle to the driver at the end of the predetermined period from the notification timing of the transition demand even when the driver's takeover operation is not detected.

Figure 1:
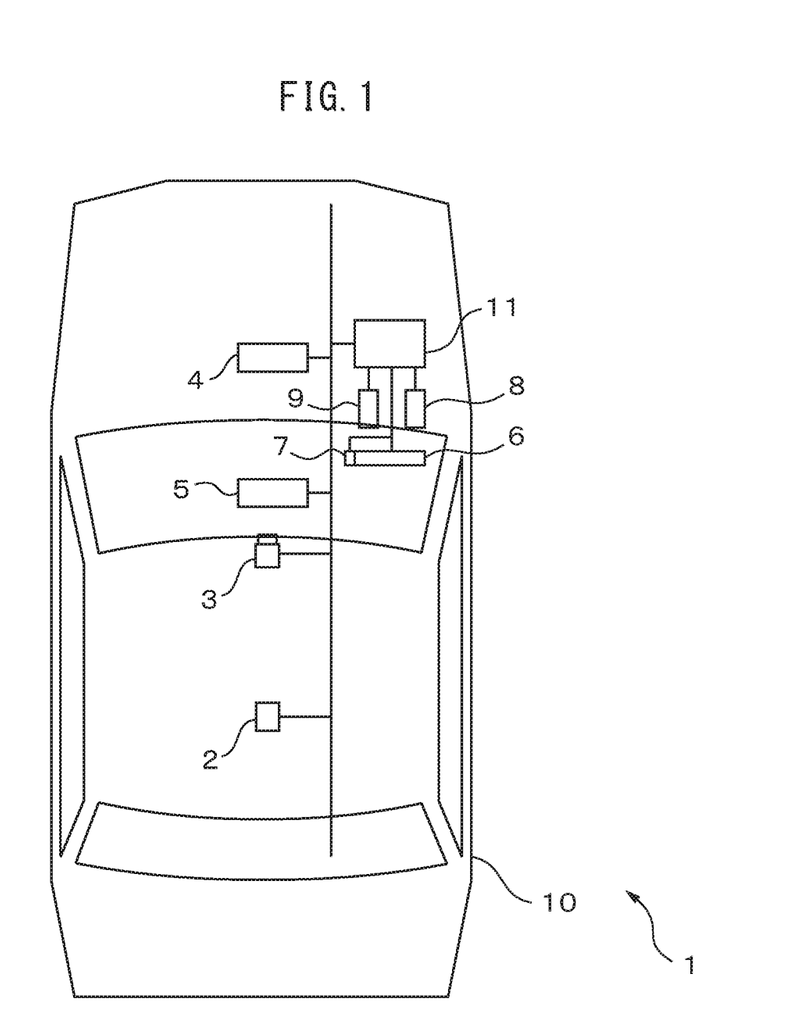
FIG. 1 schematically illustrates the configuration of a vehicle control system equipped with a vehicle controller.
Figure 2:
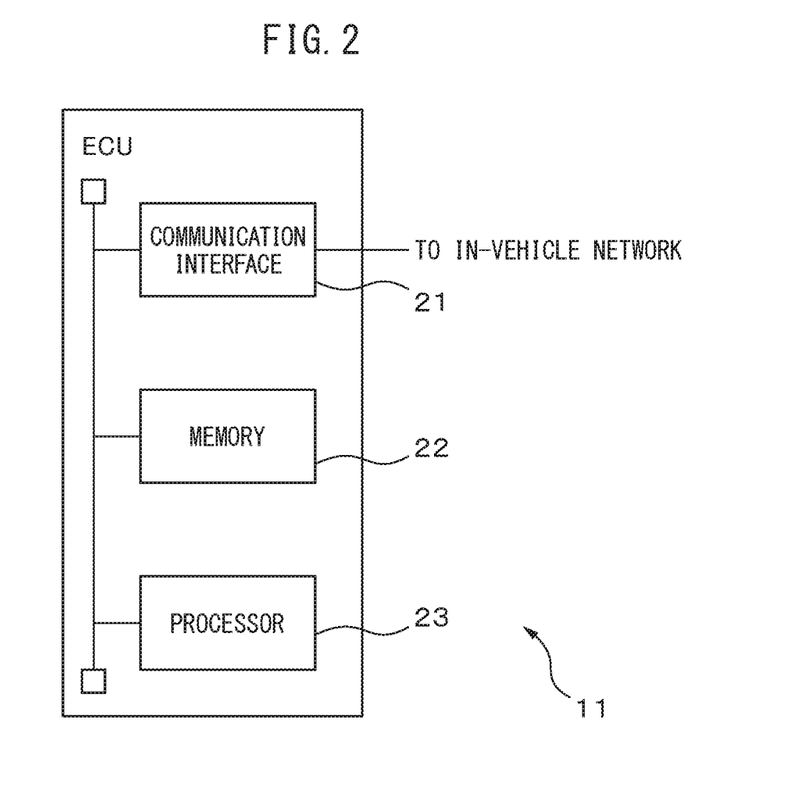
FIG. 2 illustrates the hardware configuration of an electronic control unit, which is an embodiment of the vehicle controller.

FIG. 1 schematically illustrates the configuration of a vehicle control system equipped with a vehicle controller. FIG. 2 illustrates the hardware configuration of an electronic control unit, which is an embodiment of the vehicle controller. In the present embodiment, the vehicle control system 1, which is mounted on a host vehicle 10 and controls the vehicle 10, includes a GPS receiver 2, a camera 3, a storage device 4, a user interface 5, and an electronic control unit (ECU) 11, which is an example of the vehicle controller. The ECU 11 is communicably connected to the GPS receiver 2, the camera 3, the storage device 4, and the user interface 5 via an in-vehicle network conforming to a standard such as a controller area network. The ECU 11 is further connected to a steering device 6 including a steering wheel, a touch sensor 7 provided on the steering wheel for detecting the driver's touch on the steering wheel, an accelerator device 8 including an accelerator pedal, and a brake device 9 including a brake pedal. The ECU 11 is further connected to a vehicle speed sensor (not illustrated) that measures the speed of the vehicle 10. The vehicle control system 1 may further include a distance sensor (not illustrated), such as LiDAR or radar, which measures the distances from the vehicle 10 to objects around the vehicle 10, and may further include another vehicle-mounted device, such as a wireless communication terminal (not illustrated) for wireless communication with another device or a navigation device (not illustrated) for searching for a planned travel route to a destination.

The GPS receiver 2 receives GPS signals from GPS satellites at predetermined intervals, and determines the position of the vehicle 10, based on the received GPS signals. The GPS receiver 2 outputs positioning information indicating the result of determination of the position of the vehicle 10 based on the GPS signals to the ECU 11 via the in-vehicle network at predetermined intervals. The vehicle control system 1 may include a receiver conforming to another satellite positioning system, instead of the GPS receiver 2.

The camera 3, which is an example of a vehicle exterior sensor, includes a two-dimensional detector constructed from an array of optoelectronic transducers, such as CCD or C-MOS, having sensitivity to visible light and a focusing optical system that forms an image of a target region of capturing on the two-dimensional detector. The camera 3 is mounted, for example, in the interior of the vehicle 10 so as to be oriented, for example, to the front of the vehicle 10. The camera 3 takes a picture of a region in front of the vehicle 10 every predetermined capturing period (e.g., $1/30$ to $1/10$ seconds), and generates images representing the region. Each image obtained by the camera 3 is an example of an exterior sensor signal representing the surroundings of the vehicle. The images obtained by the camera 3 may be color or grayscale images. The vehicle 10 may include multiple cameras taking pictures in different orientations or having different focal lengths. For example, the vehicle 10 may include a camera oriented to the rear of the vehicle.

Whenever an image is generated, the camera 3 outputs the generated image to the ECU 11 via the in-vehicle network.

The storage device 4, which is an example of a storage unit, includes, for example, a hard disk drive or a nonvolatile semiconductor memory. The storage device 4 stores a high-precision map used in autonomous driving control of the vehicle. The high-precision map includes, for example, information indicating road markings, such as lane-dividing lines or stop lines, and signposts for each road included in a predetermined region represented in the map. The high-precision map is an example of map information.

The storage device 4 may further include a processor for executing, for example, a process to update the high-precision map and a process related to a request from the ECU 11 to read out the high-precision map. For example, whenever the vehicle 10 moves a predetermined distance, the storage device 4 may transmit a request to obtain a high-precision map, together with the current position of the vehicle 10, to a map server via the wireless communication terminal (not illustrated). The storage device 4 may receive a high-precision map of a predetermined region around the current position of the vehicle 10 from the map server via the wireless communication terminal. When a request from the ECU 11 to read out the high-precision map is received, the storage device 4 cuts out that portion of the high-precision map stored therein which includes the current position of the vehicle 10 and which represents a region smaller than the predetermined region, and outputs the cut portion to the ECU 11 via the in-vehicle network.

The user interface 5, which is an example of the notification device or a notification unit, includes, for example, a display, such as a liquid crystal display, or a touch screen display. The user interface 5 is mounted in the interior of the vehicle 10, e.g., near an instrument panel, so as to face the driver. The user interface 5 displays predetermined information or predetermined notification, such as a transition demand, received from the ECU 11 via the in-vehicle network, in the form of an icon or text, to inform the driver of the information or notification. The user interface 5 may include one or more light sources provided on the instrument panel, a speaker mounted in the vehicle interior, or a vibrator provided in the steering wheel or the driver's seat. In this case, the user interface 5 outputs the predetermined information or notification received from the ECU 11 via the in-vehicle network, in the form of a voice signal, to inform the driver of the information or notification. Alternatively, the user interface 5 may vibrate the vibrator according to a signal received from the ECU 11 via the in-vehicle network to inform the driver of the predetermined information or notification with the vibration. Alternatively, the user interface 5 may turn on or blink the light sources according to a signal received from the ECU 11 via the in-vehicle network to inform the driver of the predetermined information or notification.

The ECU 11 executes autonomous driving control of the vehicle 10 when autonomous driving mode is applied to the vehicle 10, for example, by the driver's operation of the user interface 5. While the vehicle 10 is under autonomous driving control, the ECU 11 determines whether autonomous driving control of the vehicle 10 can continue; and when it is determined that autonomous driving control cannot continue, the ECU 11 executes a process for transferring control of the vehicle 10 from the ECU 11 to the driver. When control of the vehicle 10 is transferred to the driver, i.e., when manual driving mode is applied to the vehicle 10, the ECU 11 may further execute a function of assisting the driver in driving the vehicle 10, such as assistance in lane keeping or in collision avoidance.

As illustrated in FIG. 2, the ECU 11 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 11 to the in-vehicle network. Whenever positioning information is received from the GPS receiver 2, the communication interface 21 passes the positioning information to the processor 23. Whenever an image is received from the camera 3, the communication interface 21 passes the received image to the processor 23. In addition, the communication interface 21 passes the high-precision map read from the storage device 4 to the processor 23. The communication interface 21 outputs a signal indicating predetermined information or notification and received from the processor 23 to the user interface 5 via the in-vehicle network.

In addition, the communication interface 21 is connected to the steering device 6, the touch sensor 7, the accelerator device 8, and the brake device 9. When a steering torque detection signal indicating torque applied to the steering wheel is received from the steering device 6, the communication interface 21 passes the steering torque detection signal to the processor 23. When a detection signal indicating that the driver has held the steering wheel is received from the touch sensor 7, the communication interface 21 passes the detection signal to the processor 23. Further, when an accelerator operation signal indicating the amount of pressing-down of the accelerator pedal is received from the accelerator device 8, the communication interface 21 passes the accelerator operation signal to the processor 23. Further, when a brake operation signal indicating the amount of pressing-down of the brake pedal is received from the brake device 9, the communication interface 21 passes the brake operation signal to the processor 23.

The memory 22, which is another example of a storage unit, includes, for example, volatile and nonvolatile semiconductor memories, and stores various algorithms and various types of data used in a vehicle control process executed by the processor 23 of the ECU 11. For example, the memory 22 stores a speed threshold; messages to be notified to the driver when a transition demand is made; and parameters of the camera 3 such as the mounted position, the orientation, and the focal length. The memory 22 further stores various parameters for defining a classifier for object detection, a high-precision map read from the storage device 4, and a planned travel route generated by the navigation device. In addition, the memory 22 temporarily stores information received by the ECU 11 during the vehicle control process and various types of data generated during the vehicle control process. Examples of the information received by the ECU 11 during the vehicle control process include images of the surroundings of the vehicle 10, positioning information, a detection signal on hold of the steering wheel, a steering torque detection signal, an accelerator operation signal, and a brake operation signal.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10.

Figure 3:
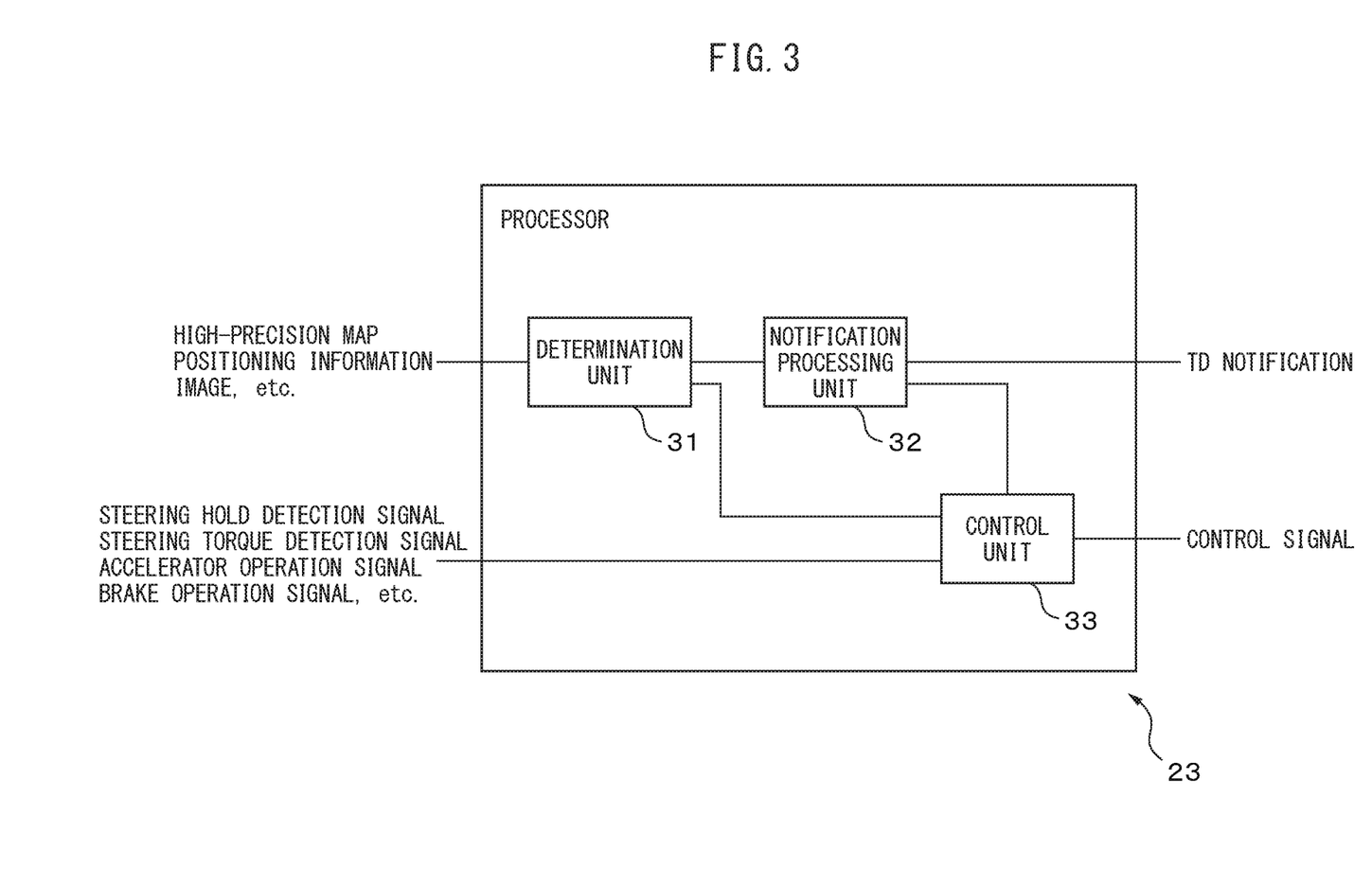
FIG. 3 is a functional block diagram of a processor of the electronic control unit, related to a vehicle control process.

FIG. 3 is a functional block diagram of the processor 23, related to the vehicle control process. The processor 23 includes a determination unit 31, a notification processing unit 32, and a control unit 33. These units included in the processor 23 are functional modules, for example, implemented by a computer program executed by the processor 23, or may be dedicated operating circuits provided in the processor 23.

The determination unit 31 determines whether to transfer driving control of the vehicle 10 to the driver, while the vehicle 10 is under autonomous driving control. For example, the determination unit 31 determines to transfer control of the vehicle 10 to the driver, in the case where the vehicle 10 will not be able to continue autonomous driving before the vehicle 10 travels through a predetermined length of section from the current position of the vehicle 10 indicated by the latest positioning information. More specifically, in the case where the vehicle 10 will go outside the area represented by the high-precision map before the vehicle 10 travels through a predetermined length of section from the current position along a planned travel route or along a road being traveled, the vehicle 10 will not be able to continue autonomous driving. Thus the determination unit 31 determines to transfer control of the vehicle 10 to the driver. For example, in the case where the high-precision map represents information on expressways but does not represent information on ordinary roads, an interchange of an expressway is a point where the vehicle goes outside the high-precision map.

The determination unit 31 may determine whether the vehicle 10 can continue autonomous driving, depending on the situation around the vehicle 10. When it is determined that the vehicle 10 cannot continue autonomous driving, the determination unit 31 may determine that control of the vehicle 10 will be transferred to the driver. For example, when another vehicle cuts in front of the vehicle 10 on a host vehicle lane on which the vehicle 10 is traveling, the determination unit 31 may determine that the vehicle 10 cannot continue autonomous driving, and that control of the vehicle 10 will be transferred to the driver. In addition, in some cases, traffic information received via the wireless communication terminal (not illustrated) indicates the presence of road construction, traffic restrictions, or traffic congestion in a predetermined length of section from the current position of the vehicle 10 along a road being traveled by the vehicle 10 or along a planned travel route. In such cases, the determination unit 31 may determine that control of the vehicle 10 will be transferred to the driver. Alternatively, when a signal indicating a breakdown is received by the ECU 11 from the camera 3 or the distance sensor (not illustrated), the determination unit 31 determines that the ECU 11 cannot continue autonomous driving control of the vehicle 10, and that control of the vehicle 10 will be transferred to the driver.

When control is transferred because of another vehicle cutting into the host vehicle lane, for example, the determination unit 31 inputs an image representing the surroundings of the vehicle 10 generated by the camera 3 into a classifier to detect a region representing the vehicle that has cut in and regions representing lane-dividing lines in the image. As such a classifier, the determination unit 31 can use, for example, a deep neural network (DNN) having architecture of a convolutional neural network (CNN) type, such as Single Shot MultiBox Detector (SSD) or Faster R-CNN. Alternatively, as such a classifier, the determination unit 31 may use a DNN having architecture of a self-attention network (SAN) type, such as a Vision transformer. Alternatively, as such a classifier, the determination unit 31 may use a DNN for semantic segmentation that identifies, for each pixel, the type of object represented in the pixel, such as a fully convolutional network or U-net. Alternatively, the determination unit 31 may use a classifier based on another machine learning technique, such as an AdaBoost classifier. Such a classifier is trained in advance with a large number of training images representing vehicles or lane-dividing lines in accordance with a predetermined training technique, such as backpropagation, so as to detect a vehicle and lane-dividing lines from an image.

On each of the left and right sides of the vertical center line of the image, the determination unit 31 determines the lane-dividing line closest to the center line of the detected lane-dividing lines as a lane-dividing line demarcating the host vehicle lane. The determination unit 31 then determines a region sandwiched between the left and right lane-dividing lines demarcating the host vehicle lane in the image as a region corresponding to the host vehicle lane. Further, of the one or more detected vehicles, the determination unit 31 determines a vehicle on the region corresponding to the host vehicle lane as a leading vehicle ahead of the vehicle 10 on the host vehicle lane. The determination unit 31 executes the above-described process on each of time-series images obtained from the camera 3, and thereby detects a vehicle and lane-dividing lines from each image and identifies a leading vehicle traveling on the host vehicle lane, based on the result of detection. In addition, the determination unit 31 applies a tracking technique, such as KLT tracker, to a region representing the leading vehicle in the latest image and regions representing a vehicle in past images to track the leading vehicle in reverse chronological order. When the result of tracking suggests that the leading vehicle detected in the latest image lay on a lane different from the host vehicle lane in a preceding predetermined period, the determination unit 31 determines that the leading vehicle has cut in front of the vehicle 10.

When it is determined that control of the vehicle 10 will be transferred to the driver, the determination unit 31 notifies the notification processing unit 32 and the control unit 33 of the result of determination. The determination unit 31 further notifies the control unit 33 of a signal indicating the event causing the determination that control of the vehicle 10 will be transferred to the driver.

When being notified by the determination unit 31 that control of the vehicle 10 will be transferred to the driver, the notification processing unit 32 notifies the driver of a transition demand via the user interface 5. To this end, the notification processing unit 32 causes a message or an icon representing a transition demand to appear on the display included in the user interface 5, or turns on or blinks the light source corresponding to the demand. Alternatively, the notification processing unit 32 outputs a voice signal representing the demand to the speaker included in the user interface 5. Alternatively, the notification processing unit 32 vibrates the vibrator included in the user interface 5 in a mode of vibration (period or intensity of vibration) depending on the demand. In the case where the user interface 5 includes two or more of the above-described devices, the notification processing unit 32 may notify the driver of a transition demand with all or some of the two or more devices.

The notification processing unit 32 notifies the control unit 33 of notification timing at which the transition demand is notified to the driver via the user interface 5.

The control unit 33 executes autonomous driving control of the vehicle 10 while autonomous driving mode is applied to the vehicle 10. The control unit 33 continues autonomous driving control until predetermined timing after the notification timing of the transition demand or until detection of the driver's takeover operation. At the predetermined timing, the control unit 33 starts deceleration control to decelerate the vehicle 10 at a predetermined deceleration as a mode of autonomous driving control. In addition, the control unit 33 measures the time elapsed since the notification timing. In the case where the speed of the vehicle 10 decreases to a predetermined speed threshold or less and where the driver's takeover operation is not detected, the control unit 33 continues deceleration control of the vehicle 10, even after a predetermined period. In the case where the speed of the vehicle 10 does not fall below the predetermined speed threshold and where the driver's takeover operation is not detected within the predetermined period of the notification timing, the control unit 33 transfers control of the vehicle 10 to the driver, regardless of whether deceleration control is executed.

The control unit 33 compares a measurement value of the speed of the vehicle 10 received by the ECU 11 from the vehicle speed sensor (not illustrated) with the speed threshold to determine whether the speed of the vehicle 10 has fallen below the speed threshold.

The predetermined timing at which deceleration control starts is, for example, the timing at which the speed of the vehicle 10 decreases to the predetermined speed threshold or less after the notification timing. Alternatively, the predetermined timing may be the notification timing of the transition demand or timing after a predetermined waiting period from the notification timing. The predetermined waiting period is set shorter than the predetermined period, e.g., at one to two seconds. The predetermined period may be, for example, three to five seconds. The predetermined speed threshold is set, for example, at the upper limit of the speed range in which the vehicle 10 may accelerate because of creeping, e.g., at 10 km/h to 20 km/h.

During autonomous driving control of the vehicle 10, the control unit 33 controls components of the vehicle 10 so that the vehicle 10 travels at a predetermined speed. The predetermined speed may be a speed set by the driver via the user interface 5 or the regulation speed of a road being traveled by the vehicle 10, which is identified by referring to the high-precision map and the current position of the vehicle 10 indicated by the latest positioning information. When a leading vehicle is traveling on the host vehicle lane, the control unit 33 may control the speed of the vehicle 10 so that the vehicle 10 keeps a certain distance from the leading vehicle. The distance between the leading vehicle and the vehicle 10 is estimated on the basis of a region representing the leading vehicle in an image generated by the camera 3. More specifically, the bottom position of the region representing the leading vehicle in an image is assumed to correspond to the position at which the leading vehicle is in contact with the road surface. In addition, the bottom position of the region in the image corresponds to the direction viewed from the camera 3 to the position at which the leading vehicle is in contact with the road surface. Thus the control unit 33 can estimate the distance between the vehicle 10 and the leading vehicle, based on the direction from the camera 3 corresponding to the bottom position of the region representing the leading vehicle in the image and the height of the mounted position of the camera 3. In the case where the vehicle 10 is equipped with a distance sensor, such as LiDAR, the control unit 33 may use the distance to an object ahead of the vehicle 10 measured by the distance sensor as the distance between the vehicle 10 and the leading vehicle.

The control unit 33 sets the degree of accelerator opening or the amount of braking so that the speed of the vehicle 10 equals the speed determined as described above. The control unit 33 then determines the amount of fuel injection according to the set degree of accelerator opening, and outputs a control signal depending on the amount of fuel injection to a fuel injector of an engine of the vehicle 10. Alternatively, the control unit 33 determines the electric power to be supplied to a motor according to the set degree of accelerator opening, and controls a driving circuit of the motor so that the determined electric power is supplied to the motor. The control unit 33 further outputs a control signal depending on the set amount of braking to the brake device 9.

When deceleration control is started, the control unit 33 sets the degree of accelerator opening or the amount of braking so that the deceleration of the vehicle 10 equals a predetermined deceleration (e.g., 0.7 m/s$^2$) during the deceleration control. The control unit 33 then determines the amount of fuel injection according to the set degree of accelerator opening, and outputs a control signal, depending on the amount of fuel injection to the fuel injector of the engine of the vehicle 10. Alternatively, the control unit 33 determines the electric power to be supplied to the motor according to the set degree of accelerator opening, and controls the driving circuit of the motor so that the determined electric power is supplied to the motor. The control unit 33 further outputs a control signal depending on the set amount of braking to the brake device 9.

When the speed of the vehicle 10 is reduced to zero while deceleration control continues, the control unit 33 may set the accelerator opening at zero or the amount of braking greater than a predetermined value so as to keep the vehicle 10 stopped.

The control unit 33 detects the driver's takeover operation, based on at least one of operation of the steering wheel, hold of the steering wheel, operation of the accelerator, and operation of the brake by the driver. After detection of the driver's takeover operation, the control unit 33 transfers driving control of the vehicle 10 to the driver. Thereafter, driving of the vehicle 10 is controlled according to the driver's driving operation.

For example, until after the predetermined period from the notification timing, the control unit 33 determines that the driver has performed takeover operation, in one of the following cases (a) to (c).

(a) When torque applied to the steering wheel indicated by a steering torque detection signal received from the steering device 6 is not less than a predetermined torque value. In other words, when it is detected that the driver has operated the steering wheel.

(b) When the ECU 11 receives a detection signal indicating that the driver has held the steering wheel from the touch sensor 7 and the amount of pressing-down of the accelerator indicated by an accelerator operation signal received from the accelerator device 8 is not less than a predetermined amount. In other words, when it is detected that the driver has held the steering wheel and operated the accelerator device 8.

(c) When the ECU 11 receives a detection signal indicating that the driver has held the steering wheel from the touch sensor 7 and the amount of pressing-down of the brake pedal is not less than a predetermined amount indicated by a brake operation signal received from the brake device 9. In other words, when it is detected that the driver has held the steering wheel and operated the brake device 9.

After the predetermined period from the notification timing, the control unit 33 may determine that the driver has performed takeover operation, on condition that the driver has operated the accelerator device 8 or the brake device 9, even if the driver is not holding the steering wheel. In other words, reception of a detection signal indicating that the driver has held the steering wheel by the ECU 11 from the touch sensor 7 may be omitted from criteria (b) and (c) above. This relaxation of the requirements for takeover of driving after the predetermined period from the notification timing enables the control unit 33 to prevent unintended acceleration of the vehicle 10 after transfer of control to the driver and to improve the driver's convenience.

After the vehicle 10 is stopped, the control unit 33 may determine that the driver has performed takeover operation, when it is detected that the driver has operated the accelerator or the brake or moved a shift lever to a parking position. Alternatively, after the vehicle 10 is stopped, the control unit 33 may determine that the driver has performed takeover operation, when an electric parking brake is turned on.

Figure 4A:
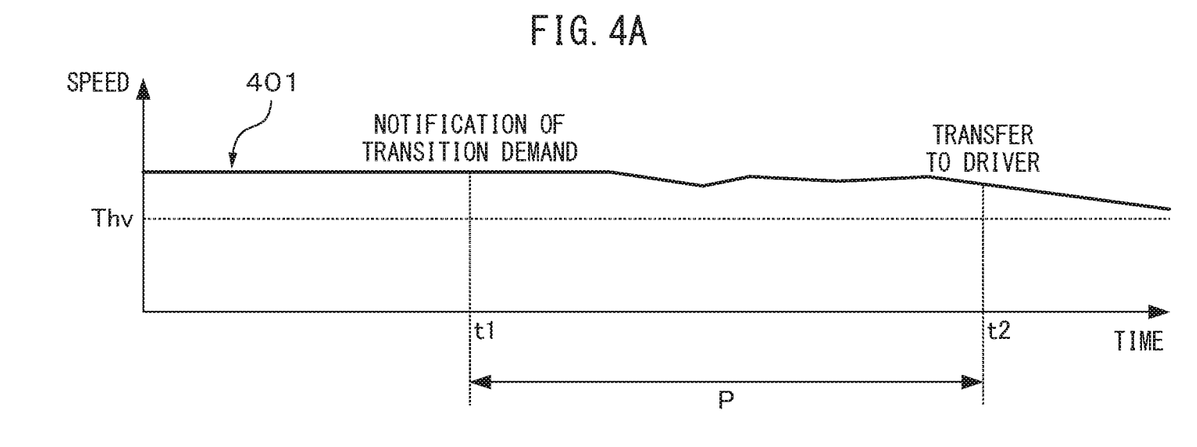
FIG. 4A schematically illustrates duration of autonomous driving control for the case where the speed of a vehicle is not less than a predetermined speed threshold until after a predetermined period from notification timing.
Figure 4B:
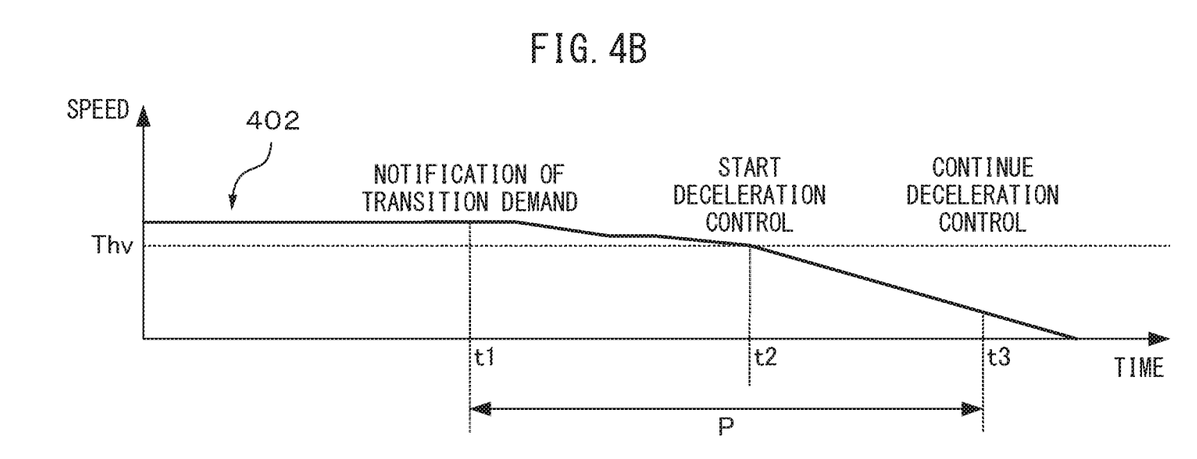
FIG. 4B schematically illustrates duration of autonomous driving control including deceleration control for the case where the speed of a vehicle falls below a predetermined speed threshold within a predetermined period of notification timing.

FIG. 4A schematically illustrates duration of autonomous driving control for the case where the speed of the vehicle 10 is not less than a predetermined speed threshold until after a predetermined period from notification timing. FIG. 4B schematically illustrates duration of autonomous driving control including deceleration control for the case where the speed of the vehicle 10 falls below a predetermined speed threshold within a predetermined period of notification timing. The abscissas and the ordinates of FIGS. 4A and 4B represent elapsed time and the speed of the vehicle 10, respectively. A graph 401 in FIG. 4A represents time-varying changes in the speed of the vehicle 10. Similarly, a graph 402 in FIG. 4B represents time-varying changes in the speed of the vehicle 10.

As illustrated in FIG. 4A, the speed of the vehicle 10 is kept constant until time t1. At time t1, a transition demand is notified to the driver. In other words, time t1 is notification timing. After the notification timing t1, autonomous driving control of the vehicle 10 continues; and the speed of the vehicle 10 varies with the passage of time, for example, because of a leading vehicle, but is greater than a speed threshold Thy until after a predetermined period P from the notification timing t1. In addition, the driver's takeover operation is not detected until after the predetermined period P from the notification timing t1. Hence, in this example, control is transferred to the driver at time t2, which is the end of the predetermined period P from the notification timing t1; and after time t2, the speed of the vehicle 10 is based on the driver's driving operation. In this example, the speed of the vehicle 10 is not reduced substantially at the time of transfer of control to the driver, and thus is reduced by engine braking even after time t2, unless the driver performs driving operation.

In the example illustrated in FIG. 4B, the speed of the vehicle 10 is also kept constant until time t1. At time t1, a transition demand is notified to the driver. In this example, at time t2 after the notification timing t1, the speed of the vehicle 10 falls below a speed threshold Thy; and after time t2, deceleration control is executed. The speed of the vehicle 10 then decreases with the passage of time. In this case, unless the driver's takeover operation is detected, the deceleration control continues even after time t3, which is the end of a predetermined period P from the notification timing t1. After the speed of the vehicle 10 is reduced to zero, the vehicle 10 is kept stopped.

Figure 5:
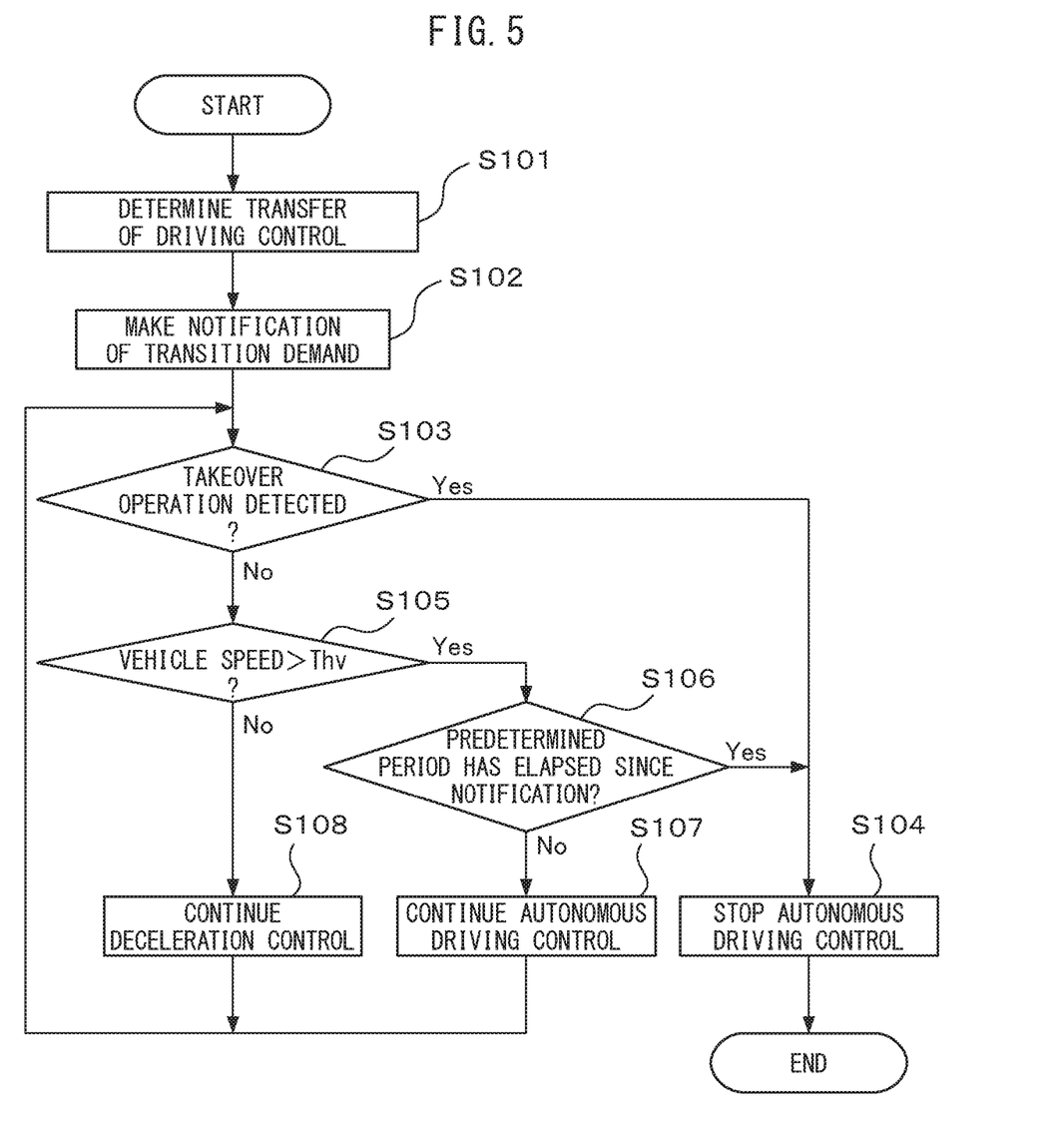
FIG. 5 is an operation flowchart of the vehicle control process.

FIG. 5 is an operation flowchart of the vehicle control process executed by the processor 23. The processor 23 executes the vehicle control process in accordance with the operation flowchart described below.

The determination unit 31 of the processor 23 determines whether to transfer driving control of the vehicle 10 to the driver (step S101). When it is determined that driving control of the vehicle 10 will be transferred to the driver, the notification processing unit 32 of the processor 23 notifies the driver of a transition demand via the user interface 5 (step S102).

After the notification timing at which the driver is notified of a transition demand, the control unit 33 of the processor 23 determines whether the driver's takeover operation is detected (step S103). When the driver's takeover operation is detected (Yes in step S103), the control unit 33 stops autonomous driving control of the vehicle 10 (step S104). Thereafter, the vehicle 10 is controlled according to the driver's driving operation; and the ECU 11 terminates the vehicle control process.

When the driver's takeover operation is not detected (No in step S103), the control unit 33 determines whether the speed of the vehicle 10 is greater than a predetermined speed threshold Thy (step S105). When the speed of the vehicle 10 is greater than the predetermined speed threshold Thy (Yes in step S105), the control unit 33 determines whether a predetermined period has elapsed since the notification timing (step S106). When the predetermined period has elapsed since the notification timing (Yes in step S106), the control unit 33 stops autonomous driving control of the vehicle 10 (step S104). Thereafter, the vehicle 10 is controlled according to the driver's driving operation; and the ECU 11 terminates the vehicle control process.

When the predetermined period has not elapsed since the notification timing (No in step S106), the control unit 33 continues autonomous driving control of the vehicle 10 with the driver notified of the transition demand (step S107). The control unit 33 then repeats processing of step S103 and the subsequent steps.

In step S105, when the speed of the vehicle 10 is not greater than the predetermined speed threshold Thy (No in step S105), the control unit 33 continues deceleration control of the vehicle 10 with the driver notified of the transition demand (step S108). The control unit 33 then repeats processing of step S103 and the subsequent steps.

As has been described above, the vehicle controller notifies a driver of a transition demand when it is determined that autonomous driving control of a vehicle will not be able to continue for a certain reason. In the case where the vehicle maintains a speed not less than a predetermined speed threshold until after a predetermined period from the notification timing of the transition demand, the vehicle controller transfers driving control to the driver at the end of the predetermined period, even when the driver's takeover operation is not detected. In this way, the vehicle controller can reliably transfer control of the vehicle to the driver when it is not expected that the vehicle will accelerate despite the driver's intention after transfer of control to the driver. At predetermined timing after the notification timing of the transition demand, the vehicle controller executes deceleration control. The vehicle controller continues the deceleration control of the vehicle even after the predetermined period from the notification timing in the case where the speed of the vehicle decreases to the predetermined speed threshold or less within the predetermined period and where the driver's takeover operation is not detected. This enables the vehicle controller to prevent unintended acceleration of the vehicle caused by creeping, which enables raising the level of safety at takeover of driving control of the vehicle from the vehicle controller to the driver.

According to a modified example, the control unit 33 may change the criteria for determining that the driver has performed takeover operation, depending on the speed of the vehicle. For example, in the case where the speed of the vehicle 10 is not greater than a predetermined speed threshold, the control unit 33 may determine that the driver has performed takeover operation, only when the driver has operated the accelerator or the brake. More specifically, in the case where the speed of the vehicle 10 is not greater than a predetermined speed threshold, the control unit 33 determines that the driver has performed takeover operation, only when criterion (b) or (c) above is satisfied. In this modified example also, reception of a detection signal indicating that the driver has held the steering wheel by the ECU 11 from the touch sensor 7 may be omitted from criteria (b) and (c) above, after the predetermined period from the notification timing. Thus, when the speed of the vehicle 10 is not greater than a predetermined speed threshold, the control unit 33 continues deceleration control unless the driver's operation of the accelerator or the brake is detected.

In the case where the speed of the vehicle 10 is greater than the predetermined speed threshold, the control unit 33 determines that the driver has performed takeover operation, when any of criteria (a) to (c) above is satisfied, i.e., when predetermined operation including hold of the steering wheel is performed. Alternatively, in the case where the speed of the vehicle 10 is greater than the predetermined speed threshold, the control unit 33 may determine that the driver has performed takeover operation, only when it is detected that the driver has operated or held the steering wheel. In other words, detection of the driver's operation of the accelerator device 8 may be omitted from criterion (b) above. Further, detection of the driver's operation of the brake device 9 may be omitted from criterion (c) above.

Figure 6:
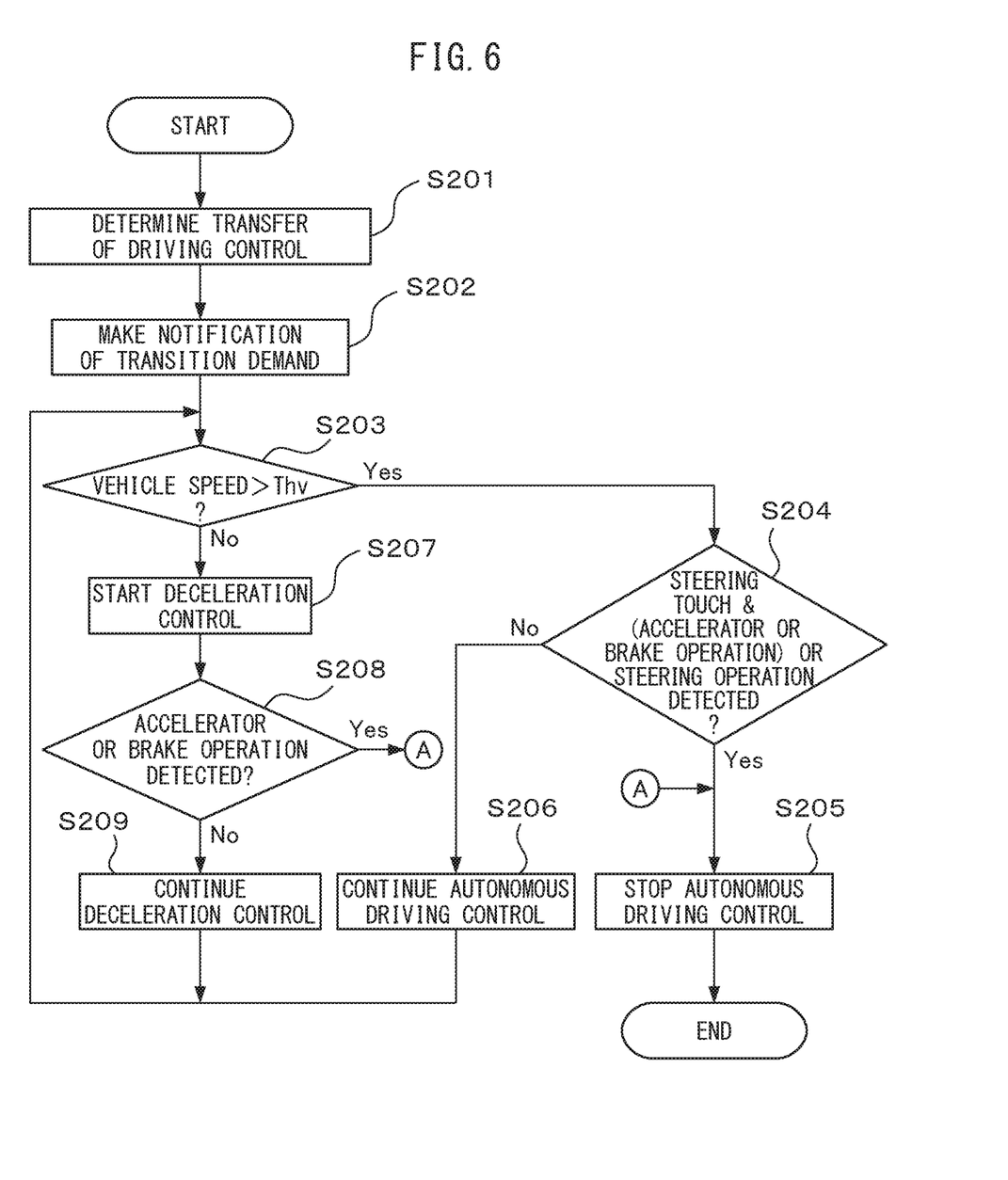
FIG. 6 is an operation flowchart of the vehicle control process according to a modified example.

FIG. 6 is an operation flowchart of the vehicle control process according to this modified example. The determination unit 31 of the processor 23 determines whether to transfer driving control of the vehicle 10 to the driver (step S201). When it is determined that driving control of the vehicle 10 will be transferred to the driver, the notification processing unit 32 of the processor 23 notifies the driver of a transition demand via the user interface 5 (step S202). The control unit 33 of the processor 23 then determines whether the speed of the vehicle 10 is greater than a predetermined speed threshold Thy (step S203).

When the speed of the vehicle 10 is greater than the predetermined speed threshold Thy (Yes in step S203), the control unit 33 determines whether one of criteria (a) to (c) above is satisfied (step S204). When one of criteria (a) to (c) above is satisfied, i.e., when the driver's takeover operation is detected (Yes in step S204), the control unit 33 stops autonomous driving control of the vehicle 10 (step S205). Thereafter, the vehicle 10 is controlled according to the driver's driving operation; and the ECU 11 terminates the vehicle control process.

When none of criteria (a) to (c) above is satisfied, i.e., when the driver's takeover operation is not detected (No in step S204), the control unit 33 continues autonomous driving control of the vehicle 10 (step S206). In this case, the driver is kept notified of the transition demand. The control unit 33 then repeats the processing of step S203 and the subsequent steps.

When the speed of the vehicle 10 is not greater than the predetermined speed threshold Thy in step S203 (No in step S203), the control unit 33 starts deceleration control (step S207). The control unit 33 then determines whether criterion (b) or (c) above is satisfied (step S208). As described above, detection that the driver has held the steering wheel may be omitted from criteria (b) and (c). When criterion (b) or (c) above is satisfied, i.e., when the driver's takeover operation including operation of the accelerator or the brake is detected (Yes in step S208), the control unit 33 stops autonomous driving control (step S205). Thereafter, the vehicle 10 is controlled according to the driver's driving operation; and the ECU 11 terminates the vehicle control process.

When neither of criteria (b) and (c) above is satisfied, i.e., when neither accelerator operation nor brake operation is detected (No in step S208), the control unit 33 continues deceleration control of the vehicle 10 (step S209). In this case, the driver is kept notified of the transition demand. The control unit 33 then repeats the processing of step S203 and the subsequent steps.

In this modified example also, the control unit 33 may transfer driving control to the driver in the case where the driver's takeover operation is not detected even after a predetermined period from the notification timing when deceleration control is not applied.

According to this modified example, at a low vehicle speed, the vehicle controller uses the driver's operation of the accelerator or the brake is a condition for takeover of driving, which prevents unintended acceleration of the vehicle when the driver takes over driving operation. At a high vehicle speed, the vehicle controller allows takeover of driving without operation of the accelerator or the brake, which prevents the driver's convenience from being compromised.

In the embodiment or modified example, the control unit 33 may set the speed threshold dynamically, depending on the environment around the vehicle 10. For example, the control unit 33 may adjust the speed threshold, depending on the gradient of a road being traveled by the vehicle 10. In this case, the control unit 33 may set the speed threshold for the case where the vehicle 10 is traveling on an uphill road less than the speed threshold for the case where the vehicle 10 is traveling on a flat road. This is because travel of the vehicle 10 on an uphill road lowers the possibility that the vehicle 10 accelerates after the stop of autonomous driving control. Conversely, the control unit 33 may set the speed threshold for the case where the vehicle 10 is traveling on a downhill road greater than the speed threshold for the case where the vehicle 10 is traveling on a flat road. This is because travel of the vehicle 10 on a downhill road raises the possibility that the vehicle 10 accelerates after the stop of autonomous driving control. The control unit 33 determines the gradient of the road being traveled by the vehicle 10 by referring to the current position of the vehicle 10 indicated by the latest positioning information and the high-precision map. According to this modified example, the control unit 33 can adjust the speed threshold at an appropriate value.

In the embodiment or modified examples, the control unit 33 may determine whether acceleration of the vehicle 10 after transfer of driving control to the driver causes a danger of a collision between the vehicle 10 and another object. To this end, the control unit 33 determines the presence or absence of the danger, depending on the situation around the vehicle 10 or the cause of determination that driving control of the vehicle 10 will be transferred to the driver. When acceleration of the vehicle 10 may cause a danger of a collision between the vehicle 10 and another object, the control unit 33 executes a process similar to that in the embodiment. More specifically, the control unit 33 continues deceleration control in the case where the speed of the vehicle 10 decreases to a predetermined speed threshold or less and where the driver's takeover operation is not detected even after a predetermined period from notification timing of a transition demand. For example, when the cause of determination of transfer of control to the driver is that another vehicle has cut in front of the vehicle 10, the control unit 33 determines that acceleration of the vehicle 10 may cause a danger of a collision between the vehicle 10 and another object, and executes a process similar to that in the embodiment. In addition, the control unit 33 may determine whether the vehicle 10 is traveling through a curve at notification timing of a transition demand, by referring to the position of the vehicle 10 indicated by positioning information at the notification timing and the high-precision map. When the vehicle 10 is traveling through a curve at the notification timing, the control unit 33 executes a process similar to that in the embodiment.

In some cases, it is expected that there will not be an immediate danger of a collision between the vehicle 10 and another object after transfer of control to the driver, as in the case where the cause of a transition demand is that the vehicle 10 goes outside the region covered by the high-precision map. In such cases, the control unit 33 may stop autonomous driving control or deceleration control of the vehicle 10 and transfer control to the driver after the predetermined period from the notification timing regardless of the speed of the vehicle 10. When the vehicle 10 under autonomous driving control is required to accelerate at notification timing at which a transition demand is notified to the driver, the control unit 33 may omit deceleration control itself.

In addition, when the driver does not perform driving operation despite transfer of control after the predetermined period from the notification timing, the control unit 33 may determine whether there is a danger of a collision between the vehicle 10 and a leading vehicle, based on the distance between the vehicle 10 and the leading vehicle as well as the speed and acceleration of the vehicle 10 relative to the leading vehicle. When there is such a danger, the control unit 33 may continue deceleration control in the case where the speed of the vehicle 10 decreases to a predetermined speed threshold or less and where the driver's takeover operation is not detected even after the predetermined period from the notification timing, as in the embodiment. Conversely, when there is not such a danger, the control unit 33 may transfer control to the driver at the end of the predetermined period from the notification timing regardless of the speed of the vehicle 10. The control unit 33 executes a process similar to that executed by the determination unit 31 to detect a leading vehicle from each of time-series images generated by the camera 3 and to track the detected leading vehicle, thereby determining time-varying changes in the distance between the vehicle 10 and the leading vehicle. The control unit 33 then applies a prediction filter, such as a Kalman filter, to the time-varying changes in the distance between the vehicles to predict time-varying changes in the distance between the vehicles, the relative speed, and the relative acceleration after the predetermined period from the notification timing. When the vehicle 10 is predicted to approach the leading vehicle within a predetermined dangerous distance, based on the result of prediction, the control unit 33 determines that there is a danger of a collision between the vehicle 10 and the leading vehicle.

Alternatively, in some cases, continuing deceleration control even after the predetermined period from the notification timing, as in the embodiment, causes a danger of a collision between the vehicle 10 and a following vehicle traveling behind the vehicle 10 on the host vehicle lane. In such cases, the control unit 33 may omit deceleration control regardless of the speed of the vehicle 10. The control unit 33 may then transfer control to the driver at the end of the predetermined period from the notification timing. In this case, the control unit 33 executes a process similar to that executed by the determination unit 31 to detect a following vehicle from each of time-series images generated by a camera 3 provided to take pictures of an area behind the vehicle 10. The control unit 33 then tracks the detected following vehicle to determine time-varying changes in the distance between the vehicle 10 and the following vehicle. The control unit 33 applies a prediction filter, such as a Kalman filter, to the time-varying changes in the distance between the vehicles to predict time-varying changes in the distance between the vehicles, the relative speed, and the relative acceleration after the predetermined period from the notification timing. When the vehicle 10 is predicted to approach the following vehicle within a predetermined dangerous distance, based on the result of prediction, the control unit 33 determines that there is a danger of a collision between the vehicle 10 and the following vehicle.

Alternatively, the control unit 33 may switch control, depending on a deceleration for the case where the vehicle 10 travels by inertia after the predetermined period from the notification timing. In this case, the control unit 33 refers to a reference table representing the relationship between the speed and deceleration of the vehicle 10 to determine the deceleration corresponding to the speed of the vehicle 10 at the notification timing. Such a reference table may be prestored in the memory 22. In the case where the vehicle 10 is driven by a motor, the reference table may represent not only the relationship between the speed and deceleration of the vehicle 10 but also the relationship between the remaining battery power and deceleration of the vehicle 10. The control unit 33 refers to the reference table to determine the deceleration corresponding to the speed and remaining battery power of the vehicle 10 at the notification timing. When the deceleration is less than a predetermined deceleration threshold, the control unit 33 may continue deceleration control in the case where the speed of the vehicle 10 decreases to a predetermined speed threshold or less and where the driver's takeover operation is not detected even after the predetermined period from the notification timing, as in the embodiment. Conversely, when the deceleration is not less than the predetermined deceleration threshold, the control unit 33 may omit deceleration control, regardless of the speed of the vehicle 10.

According to this modified example, the control unit 33 switches whether to continue deceleration control, depending on the cause of determination that driving control of the vehicle 10 will be transferred to the driver or the situation around the vehicle 10, when the driver's takeover operation is not detected. This enables the control unit 33 to ensure safety of the vehicle 10 and to make the timing of takeover of driving control to the driver more appropriate.

In addition, when autonomous driving control continues even after the predetermined period from the notification timing, as in the above-described modified example, the control unit 33 may intensify the notification of the transition demand to the driver after the predetermined period from the notification timing. For example, the control unit 33 increases the luminance of a message or an icon of the transition demand displayed on the user interface 5, and changes the color of the message or the icon to a more conspicuous color to intensify the notification of the transition demand. Alternatively, the control unit 33 may turn up the volume of a voice of the transition demand outputted from the speaker included in the user interface 5 or intensify vibration of the vibrator included in the user interface 5 to intensify the notification of the transition demand. In addition, when the driver's takeover operation is not detected even after a certain period since the notification of the transition demand is intensified, the control unit 33 may activate an emergency driver assist. More specifically, as activation of the emergency driver assist, the control unit 33 may honk a horn, turn on hazard lights, or connect to Helpnet via the wireless communication terminal to make notification of emergency.

As described above, those skilled in the art may make various modifications according to embodiments within the scope of the present disclosure.

What is claimed is:

1. A vehicle controller comprising:
  a processor configured to:
    determine whether to transfer driving control of a vehicle under autonomous driving control to a driver,
    notify the driver of a transition demand via a notification device provided in the vehicle in the case where driving control of the vehicle will be transferred to the driver,
    execute deceleration control of the vehicle at predetermined timing after notification timing of the transition demand, and
    continue deceleration control of the vehicle even after a predetermined period from the notification timing in the case where the speed of the vehicle decreases to a predetermined speed threshold or less within the predetermined period and where takeover operation by the driver to take over driving is not detected.

2. The vehicle controller according to claim 1, wherein the processor is further configured to stop autonomous driving control of the vehicle at the end of the predetermined period in the case where the speed of the vehicle is not less than the predetermined speed threshold until after the predetermined period from the notification timing and where takeover operation by the driver to take over driving is not detected.

3. The vehicle controller according to claim 2, wherein until after the predetermined period from the notification timing, the processor determines that the takeover operation has been performed, upon detection of operation of a steering wheel of the vehicle by the driver or both hold of the steering wheel and operation of an accelerator or a brake by the driver, and
  after the predetermined period from the notification timing, the processor determines that the takeover operation has been performed, upon detection of operation of the steering wheel of the vehicle by the driver or operation of the accelerator or the brake by the driver without hold of the steering wheel.

4. The vehicle controller according to claim 1, wherein when the speed of the vehicle is not greater than the predetermined speed threshold, the processor continues deceleration control of the vehicle unless operation of an accelerator or a brake by the driver is detected as the takeover operation; and when the speed of the vehicle is greater than the predetermined speed threshold, the processor stops autonomous driving control of the vehicle upon detection of operation of a steering wheel by the driver or predetermined operation by the driver including hold of the steering wheel as the takeover operation.

5. The vehicle controller according to claim 1, wherein the processor adjusts the predetermined speed threshold, depending on the gradient of a road being traveled by the vehicle.

6. The vehicle controller according to claim 1, wherein the processor is further configured to determine whether acceleration of the vehicle after transfer of driving control of the vehicle to the driver causes a danger of a collision between the vehicle and another object, depending on a cause of determination that driving control of the vehicle will be transferred to the driver or the situation around the vehicle, and continue deceleration control of the vehicle even after the predetermined period only when the processor determines that the danger exists.

7. A method for vehicle control, comprising:
  determining whether to transfer driving control of a vehicle under autonomous driving control to a driver;
  notifying the driver of a transition demand via a notification device provided in the vehicle in the case where driving control of the vehicle will be transferred to the driver;
  executing deceleration control of the vehicle at predetermined timing after notification timing of the transition demand; and
  continuing deceleration control of the vehicle even after a predetermined period from the notification timing in the case where the speed of the vehicle decreases to a predetermined speed threshold or less within the predetermined period and where operation by the driver to take over driving is not detected.

8. A non-transitory recording medium that stores a computer program for vehicle control, the computer program causing a processor mounted on a vehicle to execute a process comprising:
  determining whether to transfer driving control of the vehicle under autonomous driving control to a driver;
  notifying the driver of a transition demand via a notification device provided in the vehicle in the case where driving control of the vehicle will be transferred to the driver;
  executing deceleration control of the vehicle at predetermined timing after notification timing of the transition demand; and
  continuing deceleration control of the vehicle even after a predetermined period from the notification timing in the case where the speed of the vehicle decreases to a predetermined speed threshold or less within the predetermined period and where operation by the driver to take over driving is not detected.

\* \* \* \* \*